(No Model.)

C. W. HUNT.
CHAIN BELT.

No. 378,686. Patented Feb. 28, 1888.

Witnesses:
J. Stail
Chas. H. Smith

Inventor:
Charles W. Hunt.
per Lemuel W. Serrell
Atty.

UNITED STATES PATENT OFFICE.

CHARLES W. HUNT, OF WEST NEW BRIGHTON, ASSIGNOR TO THE C. W. HUNT COMPANY, OF NEW YORK, N. Y.

CHAIN BELT.

SPECIFICATION forming part of Letters Patent No. 378,686, dated February 28, 1888.

Application filed December 8, 1887. Serial No. 257,280. (No model.)

*To all whom it may concern:*

Be it known that I, CHARLES W. HUNT, of West New Brighton, in the county of Richmond and State of New York, have invented an Improvement in Chain Belts, of which the following is a specification.

This invention relates to that class of chain or link belts that are made to run over pulleys that are not recessed or provided with points for the links; and the present improvement is for lessening the risk of the belt slipping upon the pulleys. The links are preferably of leather or slightly-yielding material; but they may be of metal. The pulleys are grooved peripherally with V-shaped grooves adapted to receive into each groove one or two lines of the links, and the edges of the links are beveled to correspond to the inclined sides of the grooves, so that the tension upon the belt tends to wedge the links in between the inclined sides of the grooves, and thereby the frictional contact is greatly increased.

Figure 1:
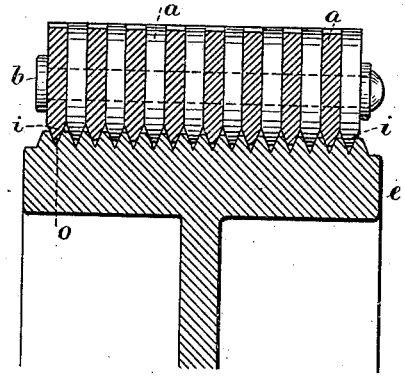
Figure 2:
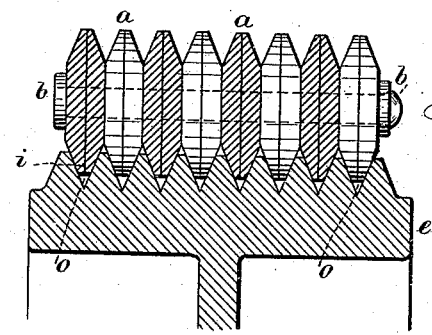
Figure 3:
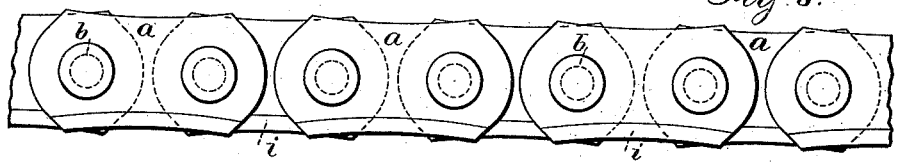
Figure 4:
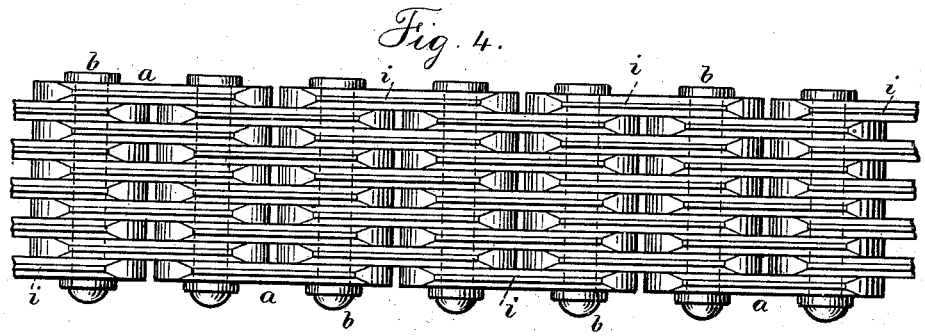

In the drawings, Figure 1 is a section of the belt and of one side of the pulley. Fig. 2 is a similar view, in which the grooves correspond in width to the thickness of two links. Fig. 3 is a side view showing the links of part of a belt, and Fig. 4 is a plan of the same.

Each link *a* is cut out of suitable material—such as sheet metal, or, preferably, leather—and of the desired length and with the necessary holes for the passage of the connecting-bolts *b*, and the links are laid side by side and lapping upon each other and connected up, so that the belt is of any desired width and of a thickness corresponding to the width of the links, as has heretofore been done in chain or link belts made of leather; but instead of the pulley *e* having a smooth surface and the edges of the links being flat I bevel the edges of the links at *i* and groove the pulley or wheel peripherally, as at *o*.

Where the peripheral grooves are the same width as the thickness of the leather or other material, the edges of the links that are in contact with the pulley are beveled in each direction, so that each link will set in one groove, as illustrated in Fig. 1; but where the grooves are of a width corresponding to the thickness of two links, then the edge of each link is only beveled in one direction and the links are placed together in pairs, as shown in Fig. 2, so that two lines of links set together into one groove. In either instance the frictional contact of the belt with the pulley is augmented by the wedging action of the links as they draw into the beveled grooves.

It is preferable to cut out the links with concave edges approximating the curvature of the pulley to which they are adapted, as shown in Fig. 3. The links may have the bevels on both edges, as seen in Fig. 2, or only on one edge, as seen in Fig. 1.

I do not claim a pulley for a belt with V-shaped grooves around its periphery; neither do I claim a flat flexible belt with longitudinal corrugations on one or both of its faces.

I claim as my invention—

1. The chain belt composed of flat links perforated and united by cross-rods, each link having the edge that comes into contact with the pulley beveled, so as to adapt such chain belt to a pulley with V-shaped peripheral grooves, substantially as set forth.

2. The chain belt composed of flat links perforated and united by cross-rods, the links having the edges that come into contact with the pulley beveled in opposite directions and the links placed together in pairs, so that the beveled edges of two lines of links are adapted to pass into one V-groove upon the pulley, substantially as set forth.

Signed by me this 6th day of December, 1887.

CHAS. W. HUNT.

Witnesses:
 GEO. T. PINCKNEY,
 WILLIAM G. MOTT.